(12) United States Patent
Cornelissen et al.

(10) Patent No.: US 10,526,425 B2
(45) Date of Patent: Jan. 7, 2020

(54) METHODS OF RELIEVING A CONDITION OF OVER-PRESSURE IN A VESSEL, PRESSURE RELIEF ASSEMBLIES, AND RELATED SEPARATOR VESSELS

(71) Applicant: ExxonMobil Chemical Patents Inc., Baytown, TX (US)

(72) Inventors: Philip H. Cornelissen, Heverlee (BE); Paul J. Clymans, Kapelle-Op-Den-Bos (BE)

(73) Assignee: ExxonMobil Chemical Patents Inc., Baytown, TX (US)

( * ) Notice: Subject to any disclaimer, the term of this patent is extended or adjusted under 35 U.S.C. 154(b) by 155 days.

(21) Appl. No.: 15/886,577

(22) Filed: Feb. 1, 2018

(65) Prior Publication Data

US 2018/0244810 A1    Aug. 30, 2018

Related U.S. Application Data

(60) Provisional application No. 62/464,717, filed on Feb. 28, 2017.

(51) Int. Cl.
| | |
|---|---|
| *F16K 17/40* | (2006.01) |
| *C08F 2/01* | (2006.01) |
| *B01J 3/03* | (2006.01) |
| *E21B 33/035* | (2006.01) |
| *E21B 41/00* | (2006.01) |
| *E21B 17/01* | (2006.01) |
| *F17C 13/04* | (2006.01) |
| *F16K 17/16* | (2006.01) |

(52) U.S. Cl.
CPC    *C08F 2/01* (2013.01); *B01J 3/03* (2013.01); *E21B 17/01* (2013.01); *E21B 33/035* (2013.01); *E21B 41/0021* (2013.01); *F16K 17/162* (2013.01); *F17C 13/04* (2013.01)

(58) Field of Classification Search
CPC .......... C08F 2/01; E21B 17/01; E21B 33/035; E21B 41/0021; B01J 3/03; F16K 17/162; F17C 13/04
USPC ............ 137/68.22, 68.19, 69, 587; 422/310; 427/372.2; 528/481
See application file for complete search history.

(56) References Cited

U.S. PATENT DOCUMENTS

| | | | | |
|---|---|---|---|---|
| 3,780,793 | A | * | 12/1973 | Didycz .................. B01J 19/002 165/47 |
| 3,854,522 | A | * | 12/1974 | Didycz ................. F16K 17/162 165/53 |
| 4,126,184 | A | * | 11/1978 | Hinrichs ................ A62C 35/08 137/68.13 |
| 4,167,968 | A | * | 9/1979 | Wietelmann ............ F22B 1/026 165/134.1 |
| 4,353,384 | A |   | 10/1982 | Gardner |
| 4,403,626 | A | * | 9/1983 | Paul, Jr. .............. F16K 11/0873 137/118.07 |
| 4,476,097 | A | * | 10/1984 | Van Pool ............... B01J 19/002 422/112 |

(Continued)

FOREIGN PATENT DOCUMENTS

GB    2093045 A    8/1982

*Primary Examiner* — Minh Q Le
(74) *Attorney, Agent, or Firm* — Frank E. Reid

(57) ABSTRACT

A method and pressure relief assembly for relieving a condition of over-pressure in a vessel are provided. In addition, a separator vessel suitable for operation in a process for polymerizing one or more olefins is provided.

25 Claims, 7 Drawing Sheets

(56) References Cited

U.S. PATENT DOCUMENTS

| | | | | |
|---|---|---|---|---|
| 4,777,974 | A | | 10/1988 | Swift et al. |
| 5,154,202 | A | * | 10/1992 | Hibler, Jr. ............. F16K 17/162 |
| | | | | 137/565.35 |
| 5,267,894 | A | * | 12/1993 | Schuck ................. F17C 13/126 |
| | | | | 454/32 |
| 9,637,569 | B2 | * | 5/2017 | Neumann ................ B01J 3/002 |
| 9,931,608 | B2 | * | 4/2018 | Littmann ................ C08F 2/004 |
| 2008/0035466 | A1 | | 2/2008 | Barnett et al. |
| 2012/0240960 | A1 | | 9/2012 | Cornelissen et al. |
| 2012/0305262 | A1 | | 12/2012 | Ballard et al. |
| 2012/0307956 | A1 | * | 12/2012 | Singh .................... G21C 1/086 |
| | | | | 376/298 |
| 2014/0262313 | A1 | * | 9/2014 | Gilmore ................ E21B 33/085 |
| | | | | 166/363 |
| 2016/0076323 | A1 | * | 3/2016 | Fraczek .................. E21B 17/01 |
| | | | | 166/367 |
| 2018/0030160 | A1 | * | 2/2018 | Wolfram ............. B01J 19/0006 |
| 2018/0080301 | A1 | * | 3/2018 | Drobniak ............. E21B 33/061 |

* cited by examiner

METHODS OF RELIEVING A CONDITION OF OVER-PRESSURE IN A VESSEL, PRESSURE RELIEF ASSEMBLIES, AND RELATED SEPARATOR VESSELS

CROSS REFERENCE TO RELATED APPLICATIONS

This application claims the benefit of Ser. No. 62/464,717, filed Feb. 28, 2017, the disclosure of which is hereby incorporated by referenced in its entirety.

FIELD OF THE INVENTION

The present invention relates to a method and pressure relief assembly for reducing the danger of ignition and explosion from the decomposition of industrial process gases under high pressure, such as ethylene, in a high-pressure polymerization plant, and is more specifically concerned with a system and method for relieving a condition of over-pressurization from ethylene decomposition in a separation vessel of a polyethylene polymerization plant.

BACKGROUND OF THE INVENTION

In the manufacture of ethylene-based polymers in a high pressure polyethylene (HPPE) process, ethylene gas is compressed into a supercritical fluid and then heated. The hot supercritical ethylene is then directed into a polymerization reactor, together with a supply of a chemical initiator and a modifier. The chemical initiator may be introduced to initiate polymerization of the free radical ethylene, while the modifier may be introduced to control the molecular weight of the resulting polyethylene. Because only about 40% of the ethylene monomers react, the resulting polyethylene product that is discharged from the reactor comprises ethylene-based polymers intermixed with unreacted ethylene monomer.

To separate the polymers from the ethylene, the product (the polymer/monomer mixture) may be directed to a high pressure separator vessel, which separates most of the polymer component (polyethylene polymer) from the monomer content (ethylene) before the product is directed to a low pressure separator vessel. The high pressure separator vessel may receive the reactor product from the reactor at about 40,000 psi. Optionally, a control (let-down) valve may depressurize the reactor product to a pressure of about 4000 psi before it is introduced into the high pressure separator vessel. The output of the high pressure separator includes a mostly-separated, polyethylene product which may still comprise about 10% unreacted ethylene. The mostly-separated, polyethylene product may then be directed to the low pressure separator vessel, where the remainder of the unreacted ethylene is flashed away from the desired polymer (polyethylene). The resulting polyethylene polymer may then be directed to downstream finishing processes and equipment.

It is well known that unstable, industrial process gases under pressure are prone to undergo decomposition and create a risk of ignition and/or explosion. For example ethylene is polymerized at high pressures (in the range of approximately 300 to 3,000 bars) and at high temperatures (in the range of approximately 150° C. to 350° C.) in the reactor and separated at a pressure in the range of approximately 100 and approximately 500 bar in a high pressure separator. The presence of impurities or an occurrence of a processing malfunction while polymerizing or separating ethylene may result in a heating of a fraction of the ethylene contained in the polymerization reactor or separator to a temperature exceeding about 450° C. Such heating is enough to initiate the decomposition of that fraction of ethylene which reaction results in a mixture of carbon, hydrogen and methane. The operating conditions within the reactor and the separator vessels promote a rapid propagation of any initiated decomposition, invariably resulting in rapid increases in pressure and/or temperature within the vessel. The decomposition gases are especially problematic because without adequate countermeasures, they may cause ignition and/or violent explosions capable of inflicting significant damage to equipment and injury to operators.

It has been taught to employ rupture discs of a small size and a large size in a low pressure separator for relieving smaller and larger excess vessel pressures in order to avoid catastrophic bursting of the vessel, such as the arrangement taught in U.S. Publication No. 2012/0240960. Release of gas through one or both of the (burst) rupture discs creates a thrusting action against the vessel and if the particular arrangement of discs are offset from the vessel centerline, the thrusting actions would also impose thrust-induced moments upon various components of the vessel and their connections, such as vessel walls and their supports and the vessel cover from which the rupture discs are supported. With high pressure separators, especially larger ones, the thrusting action and thrust-induced moments may be extreme and mechanically destructive. Further risk to person and property arises from the observed tendency of gases released from high pressure separators, reactors and the like to ignite and/or detonate.

Others have proposed deploying multiple rupture discs in a series, with venting between adjacent pairs of rupture discs being directed laterally. Such arrangements impose the same problems described above with respect to thrust induced forces and moments induced upon release of extremely pressurized gases and the risks associated with uncontrolled ignitions and/or explosions.

Accordingly, there remains a need for a method and equipment that relieve a condition of extreme pressures (over-pressure) within a process vessel (such as reactor or a high/low pressure separator), that effectively reduces risks of personal injury and damage to property. There also remains a need for a method and equipment that relieve a condition of over-pressure within a process vessel in a manner such that damage to vessel components during the pressure relief from thrusting action and thrust-induced moments is abated. Similarly, there remains a need for a method and apparatus that relieves the condition of over-pressure within a process vessel such that the risk of ignition and/or explosion during the relief process is abated.

SUMMARY OF THE INVENTION

Aspects of the present disclosure provides for a method of relieving a condition of over-pressure in a vessel having a burst pressure and a vessel gas outlet, the method comprising communicating in parallel a plurality of rupture discs with the vessel gas outlet, operatively pairing a first pair of rupture discs amongst the plurality of rupture discs by providing a first rupture disc with a capacity to rupture at a predetermined lowest level of over-pressure, providing a second rupture disc with a capacity to rupture at a predetermined intermediate level of over-pressure, and locating the first and second rupture discs opposite of each other symmetrically with respect to an axis of the vessel gas outlet. The method further comprises operatively pairing a second pair of rupture discs amongst the plurality of rupture discs by providing a third and a fourth rupture disc with a capacity to rupture at a common predetermined higher level of over-pressure, the higher level of over-pressure being higher than the intermediate pressure and lower than the burst pressure of the vessel and locating the third and fourth discs opposite of each other symmetrically with respect to the axis, whereby thrust induced moments during a relief of an over-pressurized gas from the vessel through one or more of the rupture discs are abated.

The method may further comprise providing the plurality of rupture discs with a common size and may further comprise communicating the plurality of rupture discs to a stack through a plurality of tubular bodies (exhaust pipes). In addition, the method may include extending distal end portions of the plurality of tubular bodies into a base portion of the stack symmetrically with respect to the axis of the vessel gas outlet.

In a class of embodiments, the method may include abating risk of ignition during a relief of an over-pressurized gas from the vessel through the stack by at least one of: (i) wetting an interior surface portion of the stack and/or (ii) introducing a flow of nitrogen through the stack. The wetting of an interior surface portion of the stack may comprise releasing an aqueous flow about an upper circumferential region of the interior surface portion of the stack and/or may comprise releasing the aqueous flow through a plurality of passages provided at spaced locations about an upper edge portion of the stack and/or may further include draining at least a portion of the aqueous flow at a location adjacent a base portion of the stack. The release of an aqueous flow and the draining of the aqueous flow may be performed continuously.

In addition, the wetting of an interior surface portion of the stack may further comprise discharging a flow of steam into the stack from a location adjacent the base portion of the stack with a duration sufficient to wet at least some of the interior surface portion of the stack. In some embodiments, the method may include dispersing gases within the stack during a relief of an over-pressurized gas from the vessel through the stack by discharging a flow of steam into the stack coaxially with respect to the axis of the vessel gas outlet. The steam discharge may be initiated stack upon detecting a rise in pressure in the stack over an ambient pressure such as approximately 1 bar.

The method may further comprise supporting the plurality of tubular bodies and the plurality of rupture discs from the vessel with a rupture disc block and a spool block, wherein the communication of the plurality of rupture discs with the vessel gas outlet extends along first and second coaxial passages through the spool block and the rupture disc block, respectively, the first and second passages being coaxial with respect to the axis of the vessel gas outlet.

In another class of embodiments, the method may further comprise accommodating thermal expansion and/or thrust loads of the plurality of tubular bodies by supporting the stack with a bellowed connector operative between the base portion of the stack and a location along at least some of the plurality of tubular bodies. The bellowed connector may have a capacity to be compressed, whereby the plurality of tubular bodies may be detached from the rupture disc block and displaced further into the stack away from the plurality of rupture discs so as to provide access to the plurality of rupture discs.

Another aspect of the present disclosure is a pressure relief assembly for relieving an over-pressure condition in a vessel having a burst pressure and a vessel gas outlet, the pressure relief assembly comprising a plurality of rupture discs in communication with the vessel gas outlet of the vessel, the plurality of rupture discs comprising a first pair of rupture discs including a first rupture disc with a capacity to rupture at a predetermined lower level of over-pressure, and a second rupture disc with a capacity to rupture at a predetermined intermediate level of over-pressure, the first and second rupture discs being disposed opposite of each other symmetrically with respect to an axis of the vessel gas outlet, and a second pair of rupture discs including third and fourth rupture discs having a capacity to rupture at a common predetermined higher level of over-pressure, the higher level of over-pressure being higher than the intermediate pressure and lower than the burst pressure of the vessel, the third and fourth discs disposed opposite of each other symmetrically with respect to the axis of the vessel gas outlet.

In various embodiments the plurality of rupture discs may have a common size and/or a plurality of tubular bodies may communicate the plurality of rupture discs with a stack and/or the tubular bodies may extend parallel to and are symmetrically disposed about the axis of the vessel gas outlet and/or distal end portions of at least some of the plurality of tubular bodies extend into a base portion of the stack and/or the stack further comprises a cylindrical wall concentric of the vessel gas outlet.

The pressure relief assembly may further comprise a stack and an ignition abatement system operative to abate risk of an ignition during a relief of an over-pressurized gas from the vessel through the stack by wetting an interior surface portion of the stack. The ignition abatement system may comprise an arrangement to release an aqueous flow about an upper circumferential region of the interior surface portion of the stack. In embodiments, the arrangement may comprise a cistern disposed about an upper edge portion of the stack and plurality of passages provided at spaced locations about the upper edge portion of the stack. In embodiments, the passages may comprise a plurality of wider and narrow slots in a mutually alternating sequence about the upper edge portion of the stack, wherein at least some of the wider slots of the plurality of wider and narrow slots may include a lower slot portion of a width approximately equal to a width of the narrow slots, with the plurality of wider and narrow slots having a depth less than a depth of the cistern, whereby the plurality of slots provide a greater release rate at a higher level of water in the cistern and a lower release rate at an intermediate level of water in the cistern and no release of water at or below a lower level of water in the cistern. A drain may be provided at a location adjacent the base portion of the stack together with a level sensor operative adjacent the base portion of the stack and an arrangement to supply water to the cistern responsively to the level sensor. The release of an aqueous flow may be continuous.

A further aspect of the present disclosure is a separator vessel suitable for operation in a process of polymerizing an olefin, comprising a vessel body having a burst pressure and a vessel gas outlet, a pressure relief assembly comprising a stack, a plurality of rupture discs in communication with the vessel gas outlet of the vessel, the plurality of rupture discs comprising: a first pair of rupture discs including a first rupture disc with a capacity to rupture at a predetermined lower level of over-pressure, and a second rupture disc with a capacity to rupture at a predetermined intermediate level of over-pressure, the first and second rupture discs being disposed opposite of each other symmetrically with respect to an axis of the vessel gas outlet, a second pair of rupture discs including a third and fourth rupture discs having a capacity to rupture at a common predetermined higher level of over-pressure, the higher level of over-pressure being higher than the intermediate pressure and lower than the burst pressure of the vessel, with the third and fourth discs disposed opposite of each other symmetrically with respect to the axis of the vessel gas outlet. The vessel body further comprises an inlet for receiving into the vessel body a monomer/polymer mixture comprising gas and liquid and a nozzle in communication with the inlet, the nozzle configured to promote collection of a liquid at a bottom portion of the vessel body and to promote a discharge of gas through the vessel gas outlet, the vessel gas outlet being located at an upper portion of the vessel body.

In some embodiments, the separator vessel includes a cylindrical central portion and the vessel gas outlet is concentric of the cylindrical central portion. The product inlet may extend radially through a wall of the vessel body, and communication between the product inlet and the nozzle may include a passage having an arcuate portion of approximately 90°.

The separator vessel may further comprise an arrangement to measure a level of the liquid collected at the bottom portion of the vessel body, comprising an elongated well of a nuclear source, the wellbeing extended into the bottom portion of the vessel body, with the arrangement further comprising a detector array responsive to the nuclear source disposed outside the vessel body.

In various embodiments, the first rupture disc may be configured to burst at a pressure in a range of approximately 350 to approximately 390 bar and/or the second rupture disc may be configured to burst at a pressure in a range of approximately 430 to approximately 450 bar and/or the third and fourth rupture discs are configured to burst at a common pressure in a range of approximately 475 to approximately 495 bar.

Another aspect of the present disclosure provides a method of reducing risk of detonation in a blowdown stack of vapor-liquid separator in the production of an olefin polymer, the method comprising at least one of: (i) abating a build-up of electrostatic charge along an interior surface portion of the blowdown stack during a blowdown event by wetting the interior surface portion of the blowdown stack and (ii) introducing a flow of nitrogen through the stack. In embodiments, the wetting of the interior surface portion may comprise releasing an aqueous flow from an upper circumferential region within the stack and/or may comprise injecting steam from a base portion of the stack sufficiently to wet an interior surface portion of the stack.

The above aspects may further comprise protecting the rupture discs from an environment of the vessel with a coating of polytetrafluoroethylene applied to surfaces of the rupture discs that are exposed to the environment.

BRIEF DESCRIPTION OF THE DRAWINGS

While the present disclosure is susceptible to various modifications and alternative forms, specific exemplary implementations thereof have been shown in the drawings and are herein described in detail. It should be understood, however, that the description herein of specific exemplary implementations is not intended to limit the disclosure to the particular forms disclosed herein. Moreover, certain dimensions may be exaggerated to help visually convey such principles. Further where considered appropriate, reference numerals may be repeated among the drawings to indicate corresponding or analogous elements.

DETAILED DESCRIPTION OF THE INVENTION

Definitions

The term "barg" is an abbreviation for bar gauge, that being, pressure in excess of atmospheric, wherein 1 bar is 100,000 Pa or 14.57 psi (pounds per square inch) absolute.

The term "sparge" means to agitate a fluid by the introduction of a gas (such as steam) through a pipe.

The term "abate" means to lessen the intensity, diminish in magnitude, and/or become less widespread.

Figure 1:
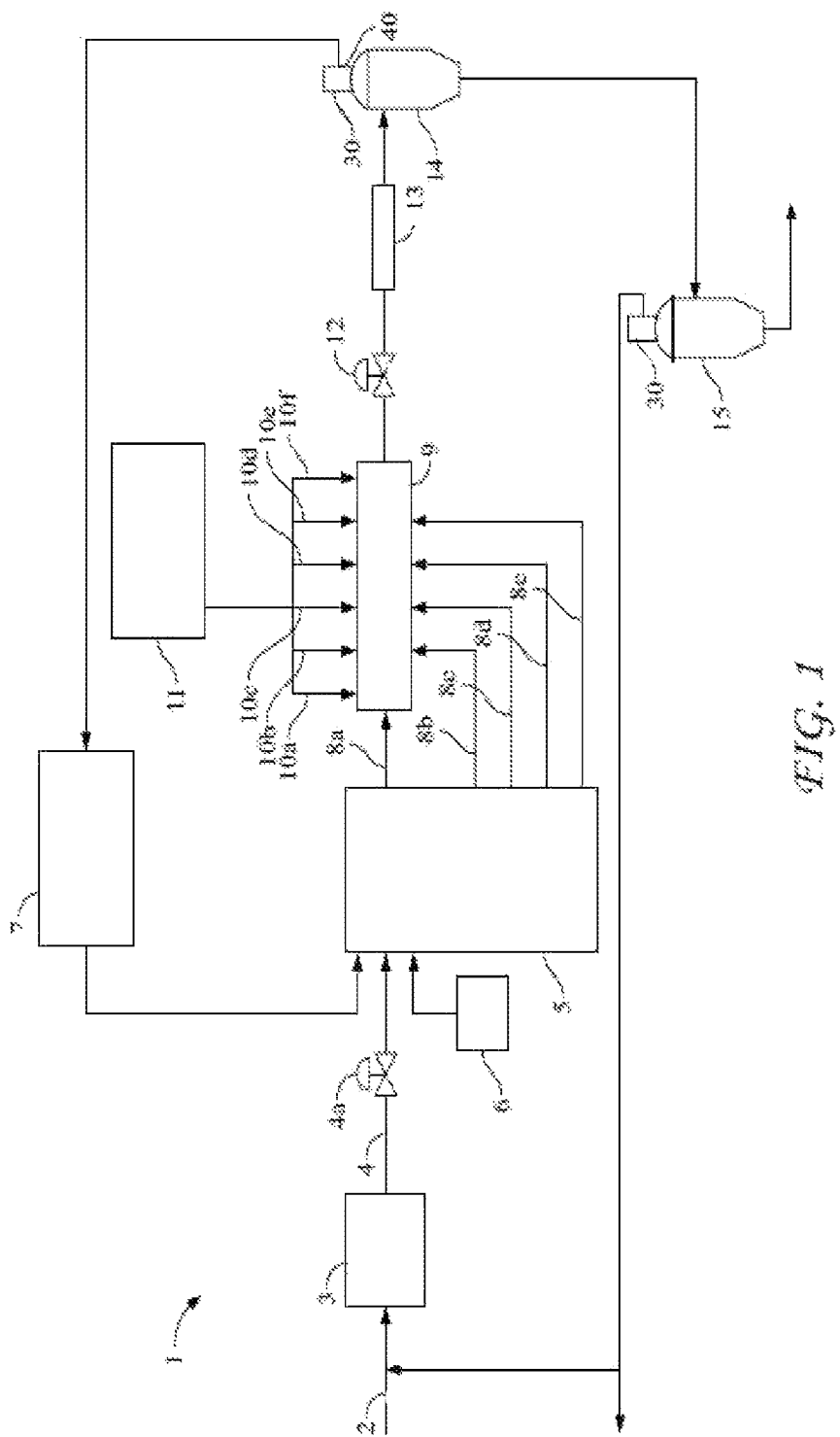
FIG. 1 is a schematic representation of a polymerization plant such as for producing polyethylene that utilizes a high pressure separator constructed in accordance with an embodiment of the invention.

Referring to FIG. 1, an exemplary polymerization plant 1 is disclosed herein which includes a high pressure separator 14 that includes a pressure relief system 30 and other novel components constructed in accordance with the various exemplary embodiments disclosed herein. The high pressure separator 14 may be operated at a pressure in the range of approximately 100 to approximately 500 barg.

The polymerization plant 1 may also include a low pressure separator 15 that may operate at a pressure in the range of from 0.1 to 20 barg, more preferably from 0.1 to 5. The low pressure separator 15 may also include a pressure relief system 30 and other novel components constructed in accordance with the various exemplary embodiments disclosed herein.

The polymerization plant 1 may further comprise an ethylene feed line 2 to supply fresh ethylene to a primary compressor 3. The ethylene discharged from the primary compressor 3 may be directed via a conduit 4 and a valve 4a to a secondary compressor 5. Also entering the secondary compressor 5 may be a stream of fresh modifier(s) and/or optionally one or more monomer(s) and a stream of recycled ethylene (not numbered). The fresh modifier stream may be supplied by a separate modifier pump 6. The recycled ethylene may be sourced from a high pressure recycle system 7.

The secondary compressor 5 may discharge compressed ethylene in multiple streams, for example, in five streams 8a-e, wherein the stream 8a may account for 20% of the total ethylene flow. The stream 8a may be heated by a steam jacket (not shown) to heat the ethylene prior to its entry into the front end of a tubular reactor 9, The four remaining ethylene side streams 8b, 8c, 8d, and 8e may each enter the reactor as sidestreams and may be cooled. The tubular reactor 9 is also shown with six initiator inlets 10a-f which may be spaced at locations along the reactor 9 and may be fed from an initiator mixing and pumping station 11.

Downstream of the sixth initiator inlet 10f and the sixth reaction zone, the tubular reactor may terminate and communicate with a high-pressure, let-down valve 12. The high-pressure, let-down valve 12 may control the pressure in the tubular reactor 9. A product cooler 13 may be operative immediately downstream of the high-pressure, let-down valve 12. Upon entry into the product cooler 13, the reaction mixture has or will enter into a phase-separated state. The output of the product cooler 13 may be directed into a high pressure separator 14 for separation. A separated, overhead gas component may be discharged from an upper portion of the high pressure separator 14, which may be directed into the high pressure recycle system 7, where the separated and unreacted ethylene is cooled and returned to the secondary compressor 5. One or more lateral outlet passages 40 may also be provided. The separated polymer product component may be collected and discharged from a bottom portion of the high pressure separator 14 and may be directed into a low pressure separator 15, which is configured to separate almost all of the remaining ethylene from the polymer. That remaining ethylene is transferred either to a flare (not shown) or a purification unit (not shown) or is recycled via the primary compressor 3. Molten polymer may flow from the bottom portion of the low pressure separator 15 to an extruder (not shown) for extrusion, cooling and pelletizing.

Figure 2:
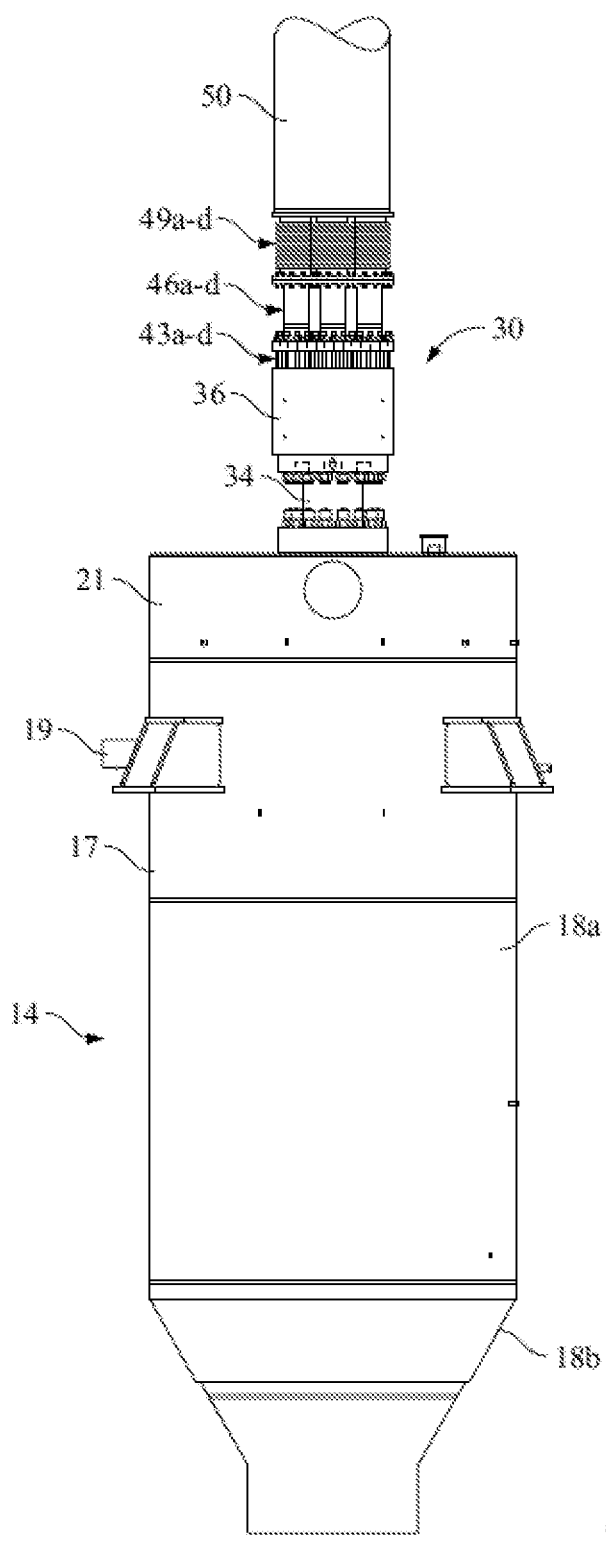
FIG. 2 is a side planar view of a high pressure separator constructed in accordance with an embodiment of the invention.
Figure 4:
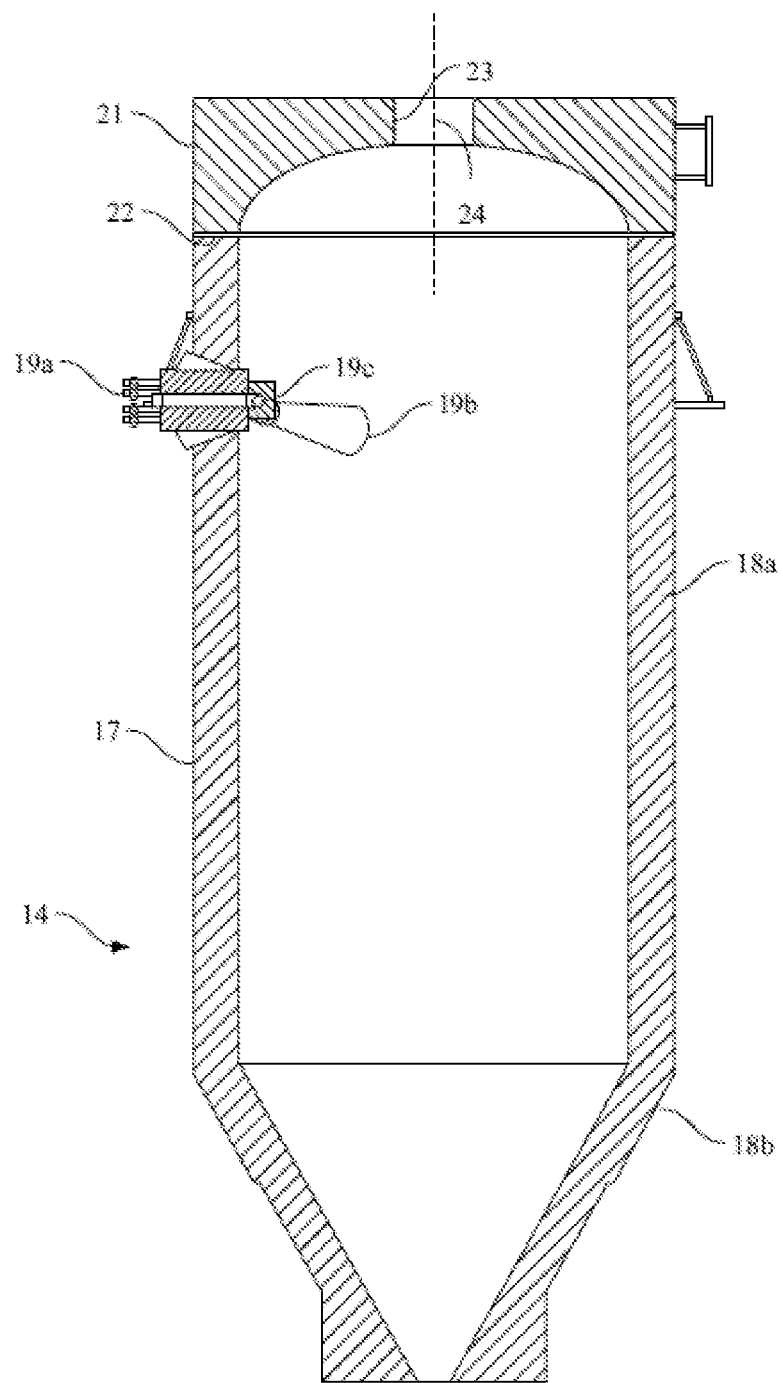
FIG. 4 is a cross-sectional side view of the vessel body of the high pressure separator shown in FIG. 3 as viewed in the direction of the double arrows IV.
Figure 7:
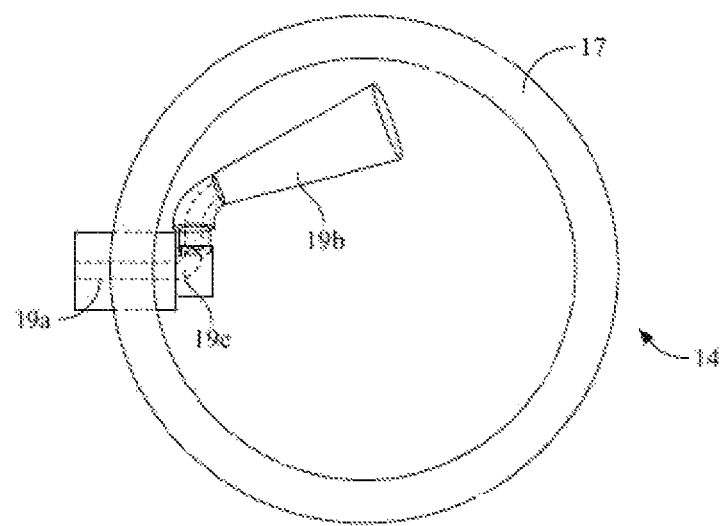
FIG. 7 is a cross-sectional top view of the separator vessel shown in FIG. 2 as viewed at the product inlet thereof.

Referring now to FIGS. 2, 4 and 7, the high pressure separator vessel 14 includes a walled vessel body 17 having a product inlet 19/19a at a location along its side for receiving a flow of polymer product from the product cooler 13 and/or the reactor 9. The vessel body 17 includes a cylindrical body portion 18a and a lower frusto-conical bottom body portion 18b that is configured to funnel separated liquid polyethylene into a conduit that may lead to a low pressure separator 15 and ultimately to an extruder (not shown). The cylindrical body portion 18a may be surrounded by a steam jacket (not shown) that continuously supplies heat to the vessel 14 during production to maintain the polyethylene product in a liquid state. A separation nozzle 19b may be mounted within the cylindrical body portion 18a and may communicate with the inlet 19a via a passage having an arcuate portion (turn) 19c of approximately 90°.

In embodiments, the vessel 14 may further include a vessel closure (cover) 21 that may be sealingly affixed to an upper rim 22 of the cylindrical body portion 18a of the vessel body 17. The vessel closure 21 may include an overhead gas outlet 23 for conducting separated, pressurized ethylene gas either back to the primary compressor 3 for recycling or to a flare or purification unit. In an embodiment, the overhead gas outlet 23 may be aligned concentrically with the cylindrical body portion 18a of the vessel body 17 such that the axis (centerline) 24 of the overhead gas outlet 23 may be coaxial of (coincide with) a longitudinal axis of cylindrical body portion 18a.

In an embodiment of a high pressure separator 14 capable of producing approximately 600 kilotons of polyethylene per annum (kta), the vessel body 17 may have an internal diameter of approximately 2.5 meters (m) and a length of approximately 5.4 meters. With such proportions and sizing, the vessel body 17 of the present embodiment provides 1.55 times the cross-sectional area and 1.3 times the length and twice the volume over a smaller vessel configured to produce 400 kta of polyethylene. In this fashion, the critical velocity for separation is not increased and the residence time is not reduced in scaling up from the smaller vessel to the larger. With a doubling of vessel volume, a challenge arose with respect to how to provide adequate safety pressure relief with the larger vessel in the event of a partial or rampant decomposition of ethylene within the vessel, a challenge which the aforementioned, prior practices did not adequately resolve.

Figure 3:
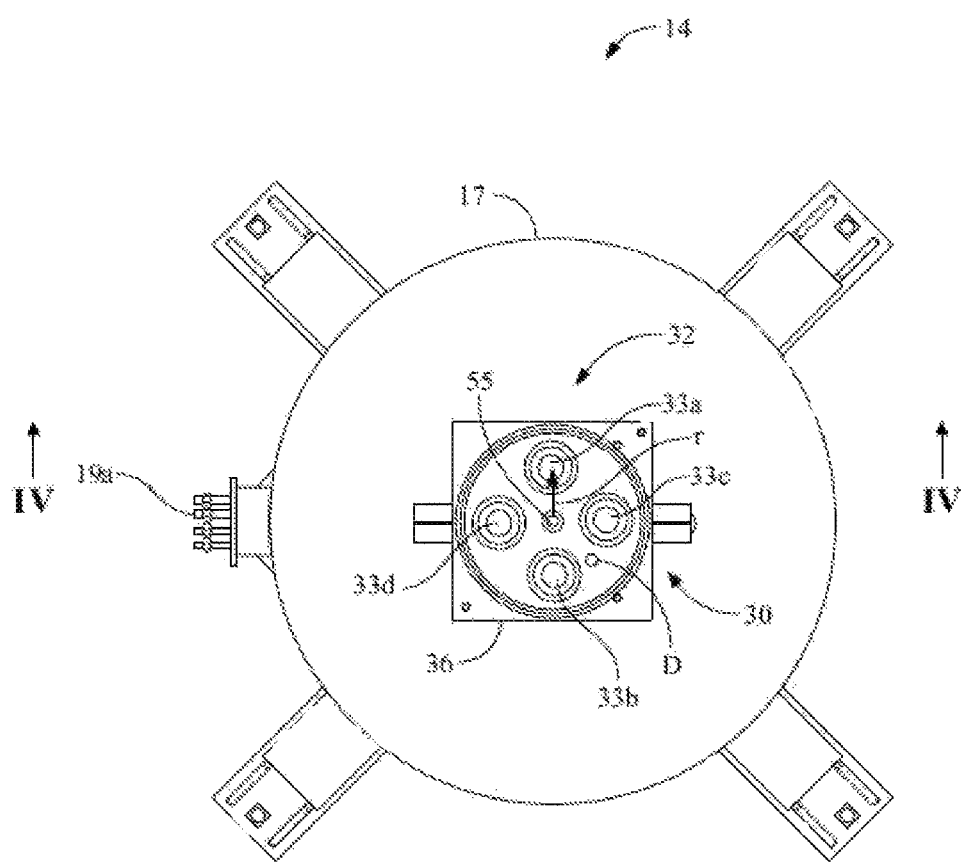
FIG. 3 is a top planar view of the high pressure separator constructed in accordance with the embodiment shown in FIG. 2.

Referring now to FIG. 2 and FIG. 3, the high pressure separator 14 of the present disclosure further comprises a pressure relief assembly 30 in communication with an interior of the vessel body 17 through its overhead gas outlet 23. The pressure relief assembly 30 may comprise an array of rupture discs 32, which in the present embodiment comprise four rupture discs 33a-d for relieving various, predetermined conditions of over-pressure within the vessel body 17 so to avoid a catastrophic bursting of the vessel body 17.

Figure 5:
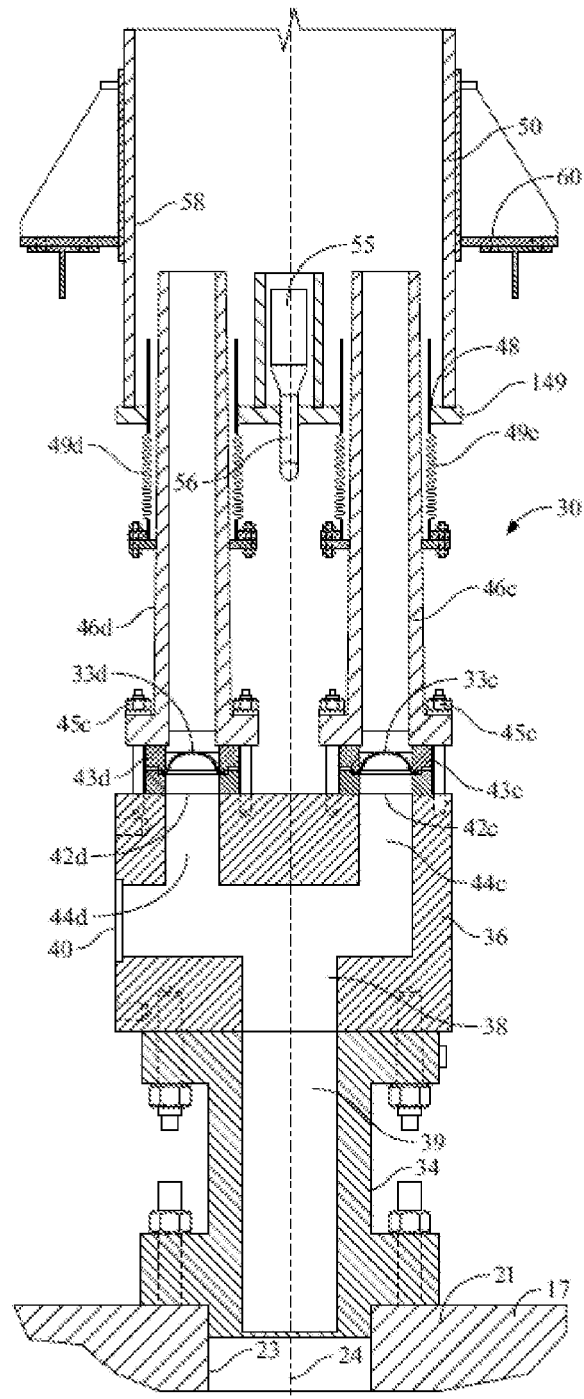
FIG. 5 is a cross-sectional side view of an exemplary embodiment of a pressure relief system of the high pressure separator shown in FIG. 3 as viewed in the direction of the double arrows IV.

Referring now also to FIG. 2 and FIG. 5, the pressure relief assembly 30 may further comprise a generally cylindrical, flanged spool body 34 which may be rigidly affixed to the vessel closure 21 of the vessel body 17 about the overhead gas outlet 23 and a generally rectangular rupture disc block 36 which may be rigidly affixed to the spool body 34. The rupture disc block 36 and the spool body 34 may include longitudinally directed passages 38 and 39, respectively, which in embodiments are mutually coaxially aligned with the axis (centerline) 24 of the overhead gas outlet 23 of the vessel closure 21. One or more lateral outlet passages 40 are provided within the rupture disc block 36 which communicate with the longitudinal passage 38 of the rupture disc block 36. During normal operating conditions of the high pressure separator 14, separated monomer (ethylene) gases leave the high pressure separator 14 for further processing (recirculation) as previously described via the overhead gas outlet 23, the longitudinally directed passages 38 and 39 and the lateral outlet passages 40.

The rupture disc block 36 may further include a plurality of outlets 42a-d (not all sub-letters are provided in every figure) at locations about an upper portion of the rupture disc block 36 which correspondingly align with the desired locations of the array 32 of the rupture discs 33a-d. In an embodiment, a plurality of passages 44a-d communicate each of the corresponding rupture disc 33 *a-d* with the longitudinal passage 38 of the rupture disc block 36, which leads to the overhead gas outlet 23 via the passage 39 of the spool body 34.

During normal operations of the vessel 14, a flow of product enters the vessel body 17 and a quantity of monomer (ethylene) gas is separated from the product and leaves the vessel 14 through the overhead gas outlet 23 to enter the rupture disc block 36 via the passages 39 and 38 of the spool body 34 and the rupture disc body 36, respectively. Thereupon, the separated monomer gas is directed to further processes through the laterally disposed outlet conduits 40 provided in the rupture disc block 36. However, should conditions arise, such as a heated decomposition of the ethylene gas or other event create a condition of over-pressure within the vessel body 17, one or more of the rupture discs 33a-d is configured to burst and open a channel through one or more of the corresponding tubular bodies (exhaust pipes) 46a-d into a dumpstack (stack) 50 for pressure relief of the separator 14, with the relieved gases being released into the atmosphere from the stack 50 or into a collector as the case may be.

Referring particularly to FIG. 2, FIG. 3, FIG. 5, and FIG. 6, in certain embodiments, each rupture disc 33a-d includes a holder body 43a-d, respectively, which is held in place adjacent the respective outlet 42a-d of the rupture disc block 36 by a releasable connection 45a-d between the rupture disc block 36 and a respective one of a plurality of tubular bodies (exhaust pipes) 46a-d. In the exemplary embodiment, the connections 45a-d may comprise bolted connections but could be other expedients such as pins, lock pins, lockable flanges or the like. The tubular bodies 46a-d provide communication from the rupture discs 33a-d to a base portion 48 of a stack 50, respectively, upon a bursting (rupture) of one or more of the rupture discs 33a-d. In embodiments, the stack 50 is a generally tubular (cylindrical) body that is open at its upper end and which may be closed at its base portion 48 with an end wall (bottom plate) 149. In the embodiment capable of separating 600 kta of polyethylene, the stack 50 may have an internal diameter of approximately 40 inches and a length of approximately 30 feet.

The tubular bodies (exhaust pipes) 46a-d also provide support for the stack 50 via a corresponding plurality of compressible (bellowed) connectors 49a-d. In an embodiment, each bellowed connector 49a-d is affixed to both the end wall 149 of the stack 50 and to one of the tubular bodies 46a-d at an intermediate location along the respective one of the tubular bodies 46a-d. With the bellowed connectors (bellows) 49a-d, thermal expansion and/or a degree of lateral displacement of the tubular bodies 46a-d is accommodated and replacement of the rupture discs 33a-d is facilitated.

To replace any one or more or all of the rupture discs 33a-d, one or more or all of the releasable connections 45a-d of the tubular bodies 33a-d with the rupture disc block 36 are disconnected and one or more or all of the tubular bodies 46a-d are urged and displaced further into the base portion 48 of the stack 50 as accommodated by compression of the respective one or more or all of the bellowed connectors 49a-d. During such action, the rupture disc block 36 and the stack 50 remaining fixed in place. The displacement may continue until sufficient clearance is achieved between lower end portions of the one or more of the displaced tubular bodies 46a-d and the rupture disc block 36 for facile removal and replacement of the one or more or all of the rupture discs 33a-d. Thereafter, the corresponding one or more or all of the tubular bodies 46a-d may be returned to their (its) original position and resecured to the rupture disc block 36 using the releasable connections 45a-d. Such arrangement avoids a need to dismount or disassemble the stack 50 and/or components attached to it and the stack 50 may remain affixed at its support (mounting) fixtures 60.

In a class of embodiments, the stack 50 of the pressure relief assembly 30 is coaxially aligned with the axis (centerline) 24 of the overhead gas outlet 23 and the tubular bodies 46a-d are disposed concentrically and symmetrically about the centerline 24 of the overhead gas outlet 23 of the vessel body 17. The array 32 of rupture discs 33a-d is configured and arranged to operate in a manner that addresses a need to relieve the vessel body 17 responsively at different (increasing) levels of vessel over-pressure in a manner that promotes consistent operation and abates thrust induced actions and moments upon the vessel body 17 and various components of the pressure relief system 30.

Referring now to FIG. 3, in particular, the array 32 of rupture discs 33a-d may all be of a common size (diameter), and may be selected from a standard size of proven performance such as a 6 inch rupture disc that is commercially available from the Fike Corporation of Blue Springs, Mo. The array 32 may comprise a first rupture disc 33a at a 12 o'clock position relative to the centerline 24 of the overhead gas outlet 23. The first rupture disc 33a may be configured to burst at a first preselected pressure corresponding to a lower, less progressed level of an over-pressure condition within the vessel body 17 that may warrant relief to avoid allowing conditions to progress further. The first rupture disc 33a is disposed a given radial distance r from the centerline 24. The second rupture disc 33b may be configured to burst at a second preselected pressure corresponding to an intermediate level of over-pressure condition within the vessel body 17 to avoid allowing conditions within the vessel body 17 to further exacerbate. The second rupture disc 30b may be located at the same radial distance r from the centerline 24 and aligned opposite of the centerline 24 from the first rupture disc 33a (here, that being a 6 o'clock position) so as to provide symmetry and thrust balancing of the gases discharged through both of the burst, rupture discs 33a and 33b.

In the embodiment shown in FIG. 3, the array of rupture discs 32 further comprises a second pair of rupture discs comprising a third rupture disc 33c at the 3 o'clock position and a fourth rupture disc 33d at the 9 o'clock position, which both may be configured to burst at a third preselected pressure corresponding to an extreme level of over-pressure condition within the vessel body 17. Thereupon, both of the third and fourth rupture discs 33c, d are configured to burst simultaneously to avoid a runaway condition within the vessel body 17. The third preselected pressure may be less than a known burst pressure of the vessel body 17 by a desired margin of safety. In an embodiment the third and fourth rupture discs 33c,d may be located at the same radial distance r from the centerline 24 and may be disposed opposite of each other from the centerline 24 so as to provide a symmetry and thrust balancing as the gases are discharged through all of the burst rupture discs 33a-d. Having the third and fourth rupture discs 33c, d burst simultaneously assures ample addition of channels for relief of extreme over-pressure conditions so that potentially, catastrophic consequences are avoided. It is contemplated, but not shown in the figures, that the rupture disc array 32 of the pressure relief system 30 could include additional pairs of equally sized, oppositely disposed rupture discs that are configured to burst at a common preselected burst pressure to provide even more channels for relieving extreme over-pressure conditions, if desired. Such rupture disc arrays 32 might comprise six or eight rupture discs or more that may be symmetrically disposed about the centerline 24.

Because of the symmetrical disposition of the rupture disc array 32 about the centerline 24 and it's manner of operation, including a sequentially opening of the first and second rupture discs 33a, 33b opposite of each other and a simultaneous opening the third and fourth rupture discs 33c, d which are disposed and opposite of each other, the rupture disc array 32 reduces the impact of thrusting forces generated upon release of hot, highly pressurized gas through each of the rupture discs 33a-d. Without such measures, an imbalance of thrust loads and induced moments would present risk of damage to supportive structure (such as rupture disc block 36, the spool 34 and the vessel body 17 and the sealed connections therebetween. Uneven thrust loads and moments threaten sealed connections, whose failure at our about the rupture disc block 36, the spool 34 and/or components of the vessel body 17 could lead to disastrous consequences or in the least, exacerbate expense and time to recondition the high pressure separator after an event. With the symmetrical disposition of the rupture disc array 32 and its manner of operation, the aforementioned risks associated with an unbalanced pressure relief are abated.

With the four rupture disc array 32 considerable additional venting areas are efficiently and flexibly provided over systems relying on only one or two rupture discs.

In an exemplary embodiment with a vessel body 17 having a test pressure of 629 bar, the first rupture disc 33*a* may be configured to burst at a pressure in the range of approximately 350 to approximately 390 bar; the second rupture disc 33*b* may be configured to burst at a pressure in the range of approximately 430 to approximately 450 bar; and the third and fourth rupture discs 33*c,d* may be configured to both rupture at a common pressure in the range of approximately 475 to approximately 495 bar. In this embodiment, each of the rupture discs has a common size of 6 inches diameter. It is contemplated that the disc array 32 might be configured to include a third pair of rupture discs 33 configured to burst simultaneously and at the same pressure as would the third and fourth rupture discs 33*c, d* (at the common pressure in the range of approximately 475 to approximately 495 bar) or instead to burst simultaneously and at higher common pressure level than the aforementioned common pressure but less than the aforementioned test pressure with a margin for safety.

It is noted that in FIG. 2, one opposing pair of exhaust pipes 46 (and bellowed connectors 49) is shown to the left and right and that only a first one of the second opposing pair is shown therebetween, the other being blocked from view by the first. Furthermore, in embodiments wherein the rupture discs 33*a-d* are of a common size (diameter), the tubular bodies 46*a-d* may also have a common size (internal diameter).

In embodiments, the pressure relief system 30 further comprises an ignition abatement system comprising a steam injector 55 which is supported from the base portion 48 of the stack 50. In embodiments, the injector 55 may be located centrally or coaxially with respect to the array of tubular bodies 46*a-d*. The steam injector 55 may communicate with an external source of pressurized steam the via a valved conduit 56. Upon a rise in detected pressure in the stack 50 or a burst of one or more of the rupture discs 33*a-d*, a controller may open the valved conduit 56 to supply steam to the steam injector 55 to sparge gases discharged into the stack 50 from one or more of the tubular bodies 46*a-d* to promote a dispersion of gases within the stack 50. The steam injector 55 may be also operated before and during a pressure relief event to wet at least portions of the interior surfaces 58 of the stack 50 with water vapor and/or droplets of condensed water vapor. The water vapor/droplets abate the tendency of relieved (released) gases passing rapidly along the interior surfaces 58 of the stack 50 to impart an electrical charge (static electricity) to those surfaces 58, thereby reducing the risk of spark and ignition of the passing gases.

In lieu or in addition, the controller may be configured to open the valved conduit 56 continuously during normal operation of the high pressure separator 14 so as to wet at least some of the interior surfaces 58 of the stack 50 with water vapor/droplets in advance of any over-pressure condition arising in the vessel body 17. Droplets of condensed water tending to flow downwardly along the interior surfaces 58 of the stack 50 and to collect at the base portion 48 thereof may be removed with a drain D provided at the base portion 58 of the stack 50.

In embodiments, the steam may be introduced into the base portion 48 of the stack 50 at a pressure in the range of about 15 to about 40 barg. The conditions of the steam flow may be selected so as to obtain a 3 meter per second velocity through the stack 50.

Figure 6:
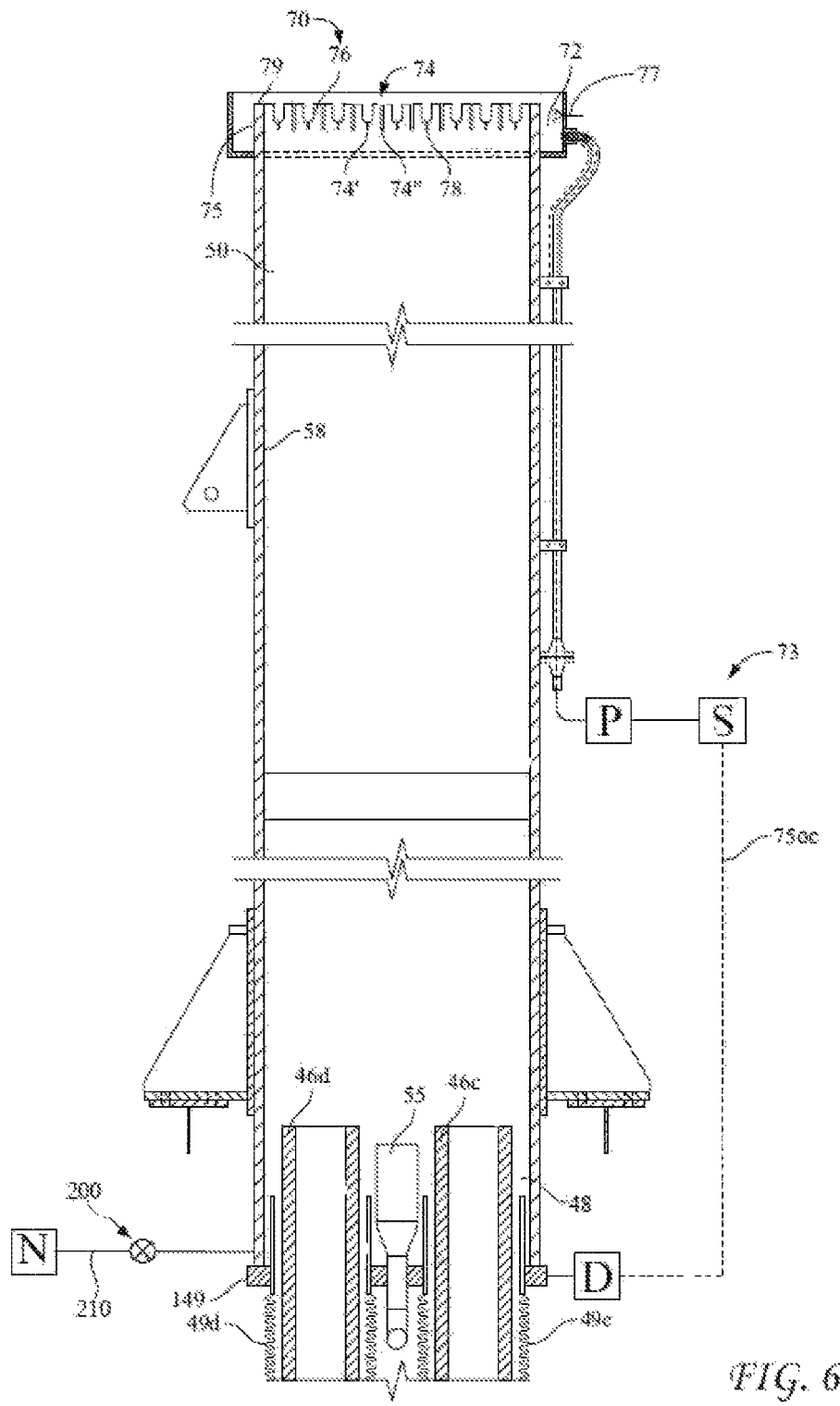
FIG. 6 is a cross-sectional side view of another exemplary embodiment of a pressure relief system of the high pressure separator shown in FIG. 3 as viewed in the direction of the double arrows IV.

Referring to FIG. 6, in a class of embodiments, the ignition abatement system may comprise instead or in addition a waterfall 70 comprising an annular cistern (reservoir) 72 disposed about an upper outer periphery 75 of the stack 50, a water delivery system 73 for controllably supplying water to the cistern 72 at a selected rate, and a plurality of passages 74 through an upper edge portion (rim) 76 of the stack 50 which is configured to draw water from the cistern 72 and to release the drawn water about the upper circumferential region of the interior surfaces 58 of the stack 50. Water that is released upon the interior surfaces 58 of the stack 50 may flow by gravity to the base portion 48 of the stack 50 and may then be removed through the drain D.

In an embodiment, the water delivery system 73 comprises a suitable source of water S, a suitable pump P and the drain D together with an optional re-circulatory conduit 75*oc* from the drain D to the source of water S. The re-circulatory conduit 75*oc* may include a filter. In an embodiment, the water delivery system 73 may further comprise a sensor 77 adjacent the cistern 72 which is configured to generate a signal indicative of one or more water levels in the cistern 72 and a suitable controller configured to adjust operation of the pump P responsively to the signal generated by the sensor so as to controllable maintain a desired level of water in the cistern 72.

The plurality of passages 74 may comprise a plurality of equally spaced slots at spaced locations about the upper edge portion 76 of the stack 50. In some embodiments, the passages 74 may comprise a plurality of wider and narrow slots 74', 74" in a mutually alternating sequence about the upper edge portion 76 of the stack 50, at least some of the wider slots 74' of the plurality of wider and narrow slots 74', 74" including a lower slot portion 78 of a width approximately equal to a width of the narrow slots 74". The plurality of wider and narrow slots 74', 74" may have a depth less than a depth of the cistern, whereby the plurality of slots have a capacity to provide a greater release rate at a higher level of water in the cistern 72 and a lower release rate at an intermediate level of water in the cistern 72 and no release at or below a lower level of water in the cistern 72. Such arrangement facilitates management of the water level in the cistern 72 and maintenance/establishment of a wetted condition along at least some of the interior surfaces 58 of the stack 50. For example during shutdown of the separator 14 (or the entire system 1 or other period of inactivity), the water level may be allowed to drop to a level below the slots 74 so as to conserve water. Additionally, the pump P may be operated at an intermediate continuous level for maintaining the water level at the cistern 72 where only a reduced flow of water is released onto the interior surfaces 58 of the stack 50 occurs through the narrow slots 74" and the narrow portions 78 of the wider slots 74'. During periods of anticipated need for activating the pressure relieving system 30 and while the system is activated, the pump P may be operated at a higher continuous level of operation to maintain a greater flow of water through the narrow slots 74" and the wider portions of the wider slots 74'. With the cistern 72 having a upper rim 79 higher than the that of the stack 50, the pump P may be operated at an even higher, emergency level of continuous operation to maintain a yet greater flow of water both over the edge portion (rim) 76 of the stack 50 and through the plurality of narrow and wider slots 74', 74".

The release of water from the cistern 72 of the waterfall 70 contacts substantial portions of the interior surfaces 58 the stack 50 with water so as to abate the tendency of electrical charges (static electricity) to collect along the interior surfaces 58 the stack 50 as gases pass rapidly past those surfaces 58, thereby reducing the risk of spark and ignition of the passing gases.

In a class of embodiments, the narrow slots 74" (and the lower portions 78 of the wider slots 74') may have a width of approximately 5 mm; whereas the upper portions of the wider slots 74' may have a width of approximately 30 mm.

In embodiments, the ignition abatement system may comprise instead or in addition a nitrogen delivery system 200 which may comprise a source of nitrogen gas N and a valved conduit 210 in communication with the base portion 48 of the stack 50. During operation of the high pressure separator 14, the valved conduit 210 may be opened by a suitable controller to maintain a continuous flow of nitrogen gas into the base portion 48 of the stack 50 through a suitable header. The continuous supply of nitrogen into the stack 50 has an inerting effect against an ignition during an overpressure relief event. The flow rate of nitrogen may be selected as a function of the diameter of the stack 50. For example, a stack with a 32 inch diameter might be adequately addressed with a nitrogen flow of approximately 30 cubic meters per hour (30 m3/h); whereas a stack with a 10 inch diameter might be adequately addressed with a flow of approximately 2 cubic meters per hour (2 m3/h).

Figure 8:
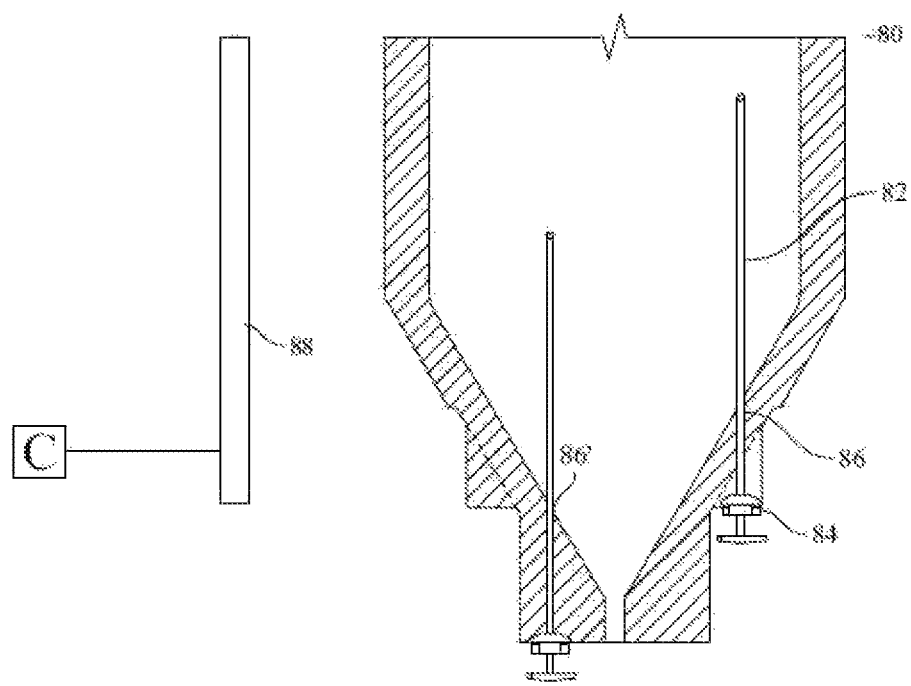
FIG. 8 is a cross-sectional representation of a level sensor usable in the high pressure separator shown in FIG. 2.

Referring now to FIG. 8, in an embodiment, the high pressure separator 14 may further comprise an arrangement 80 to detect the level of collected polymer (such as a polyethylene) within the lower frusto-conical bottom body portion 18b of the vessel body 17. The arrangement 80 may comprise art elongated, rod-like well 82 of a nuclear source and a base 84 at a lower end portion of the rod-like well 82. The rod-like well 82 may be extended through a longitudinally extending port 86, or alternatively 86', provided through the wall of the vessel body 17 so that the rod-like well 82 extends longitudinally through at least a portion of internal space encompassed by the frusto-conical bottom body portion 18b of the separator 14 and optionally at least some of internal space encompassed by the cylindrical body portion 18a of the separator 14. Upon a desired positioning of the rod-like well 82 within the vessel body 17, the base portion 84 is affixed to an exterior portion of the vessel body 17.

The level detector may further comprise an array of detectors 88 disposed outside of the vessel body 17 which is positioned relative to the mounted rod-like well 82 so as to detect differences in transmissions from portions of the rod-like well 82 as impacted by the presence and absence of molten polymer. Signals generated from the detector array 88 may be communicated to a controller C that is configured for correlating differences in detected levels of transmission to an indication of a corresponding level of the polymer collected within the vessel body 17. The controller C may be further configured to use the detected level and other data to control operation of the vessel 14 and/or other components of the system 1.

The vessel body 17 may include a nitrogen purge line 27 for replacing air in the vessel with inert nitrogen prior to putting the vessel on-line, thereby avoiding any degradation (oxidation) of the polyethylene product during start-up.

In embodiments, a coating of polytetrafluoroethylene (PTFE) may be applied to the ambient (upper) sides of the rupture discs 33a-d (such as the side visible in FIG. 3) to protect the rupture discs 33a-d from atmospheric corrosion at their upper surfaces, wall thinning and stress cracking from corrosion.

While the various embodiments of the pressure relief system 30 has been described in the context of its application to a high pressure separator 14, these teachings are readily adaptable to other applications such as the low pressure separator 15 or other components of the polymerization system 1, such as by way of non-limiting example, its reactor 9. The teachings are also applicable to components of systems configured to execute processes other than a polymerization.

While the system, apparatus, assembly, vessel, and method of this invention have each been described with respect to various embodiments, numerous modifications, equivalences and variations of this invention will become evident to persons of skill in the art. All such modifications, equivalences and variations are encompassed within the scope of this invention, which is limited only by the appended claims and their equivalences.

The phrases, unless otherwise specified, "consists essentially of" and "consisting essentially of" do not exclude the presence of other steps, elements, or materials, whether or not, specifically mentioned in this specification, so long as such steps, elements, or materials, do not affect the basic and novel characteristics of the invention, additionally, they do not exclude impurities and variances normally associated with the elements and materials used.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

All priority documents are herein fully incorporated by reference for all jurisdictions in which such incorporation is permitted and to the extent such disclosure is consistent with the description of the present invention. Further, all documents and references cited herein, including testing procedures, publications, patents, journal articles, etc. are herein fully incorporated by reference for all jurisdictions in which such incorporation is permitted and to the extent such disclosure is consistent with the description of the present invention.

What is claimed is:

1. A method of relieving a condition of over-pressure in a vessel having a burst pressure and a vessel gas outlet, the method comprising:

communicating in parallel a plurality of rupture discs with the vessel gas outlet;

operatively pairing a first pair of rupture discs amongst the plurality of rupture discs by:

providing a first rupture disc with a capacity to rupture at a predetermined lowest level of over-pressure;

providing a second rupture disc with a capacity to rupture at a predetermined intermediate level of over-pressure;

locating the first and second rupture discs opposite of each other symmetrically with respect to an axis of the vessel gas outlet; and operatively pairing a second pair of rupture discs amongst the plurality of rupture discs by:
providing a third and a fourth rupture disc with a capacity to rupture at a common predetermined higher level of over-pressure, the higher level of over-pressure being higher than the intermediate pressure and lower than the burst pressure of the vessel; and
locating the third and fourth discs opposite of each other symmetrically with respect to the axis;
whereby thrust induced moments during a relief of an over-pressurized gas from the vessel through one or more of the rupture discs are abated.

2. The method of claim 1, further comprising providing the plurality of rupture discs with a common size.

3. The method of claim 1, further comprising communicating the plurality of rupture discs to a stack through a plurality of tubular bodies.

4. The method of claim 3, further comprising extending distal end portions of the plurality of tubular bodies into a base portion of the stack symmetrically with respect to the axis of the vessel gas outlet.

5. The method of claim 1, further comprising abating risk of ignition during a relief of an over-pressurized gas from the vessel through the stack by at least one of: (i) wetting an interior surface portion of the stack and/or (ii) introducing a flow of nitrogen through the stack.

6. The method of claim 5, wherein the wetting of an interior surface portion of the stack comprises releasing an aqueous flow about an upper circumferential region of the interior surface portion of the stack.

7. The method of claim 6, wherein the release of an aqueous flow comprises releasing the aqueous flow through a plurality of passages provided at spaced locations about an upper edge portion of the stack.

8. The method of claim 5, wherein the wetting of an interior surface portion of the stack further comprises draining at least a portion of the aqueous flow at a location adjacent a base portion of the stack.

9. The method of claim 8, wherein the release of an aqueous flow about an upper region of the interior surface portion of the stack and the draining of the aqueous flow adjacent the base portion of the stack are performed continuously.

10. The method of claim 5, wherein the wetting of an interior surface portion of the stack further comprises discharging a flow of steam into the stack from a location adjacent the base portion of the stack with a duration sufficient to wet at least some of the interior surface portion of the stack.

11. The method of claim 3, further comprising dispersing gases within the stack during a relief of an over-pressurized gas from the vessel through the stack by discharging a flow of steam into the stack coaxially with respect to the axis of the vessel gas outlet.

12. The method of claim 3, further comprising initiating the discharge of a flow of steam into the stack upon detecting a rise in pressure in the stack over an ambient pressure.

13. The method of claim 12, wherein the rise in pressure is approximately 1 bar.

14. The method of claim 5, wherein the wetting of an interior surface portion of the stack comprises discharging a flow of steam into the stack coaxially with respect to the axis of the vessel gas outlet by an amount sufficient to wet at least some of the interior surface portion of the stack.

15. The method of claim 3, further comprising supporting the plurality of tubular bodies and the plurality of rupture discs from the vessel with a rupture disc block and a spool block, wherein the communication of the plurality of rupture discs with the vessel gas outlet extends along first and second coaxial passages through the spool block and the rupture disc block, respectively, the first and second passages being coaxial with respect to the axis of the vessel gas outlet.

16. A pressure relief assembly for relieving an over-pressure condition in a vessel having a burst pressure and a vessel gas outlet, the pressure relief assembly comprising:
a plurality of rupture discs in communication with the vessel gas outlet of the vessel, the plurality of rupture discs comprising:
a first pair of rupture discs including a first rupture disc with a capacity to rupture at a predetermined lower level of over-pressure, and a second rupture disc with a capacity to rupture at a predetermined intermediate level of over-pressure, the first and second rupture discs being disposed opposite of each other symmetrically with respect to an axis of the vessel gas outlet; and
a second pair of rupture discs including third and fourth rupture discs having a capacity to rupture at a common predetermined higher level of over-pressure, the higher level of over-pressure being higher than the intermediate pressure and lower than the burst pressure of the vessel, the third and fourth discs disposed opposite of each other symmetrically with respect to the axis of the vessel gas outlet.

17. The pressure relief assembly of claim 16, wherein the plurality of rupture discs have a common size.

18. The pressure relief assembly of claim 16, further comprising a plurality of tubular bodies communicating the plurality of rupture discs with a stack.

19. The pressure relief assembly of claim 18, wherein the tubular bodies extend parallel to and are symmetrically disposed about the axis of the vessel gas outlet.

20. The pressure relief assembly of claim 18, wherein distal end portions of at least some of the plurality of tubular bodies extend into a base portion of the stack.

21. The pressure relief assembly of claim 18, wherein the stack further comprises a cylindrical wall concentric of the vessel gas outlet.

22. The pressure relief assembly of claim 18, further comprising an ignition abatement system operative to abate risk of an ignition during a relief of an over-pressurized gas from the vessel through the stack at least one of: (i) wetting an interior surface portion of the stack and/or (ii) introducing a flow of nitrogen through the stack.

23. A separator vessel suitable for operation in a process of polymerizing one or more olefins, the separator vessel comprising:
a vessel body having a burst pressure and a vessel gas outlet;
a pressure relief assembly comprising:
a stack;
a plurality of rupture discs in communication with the vessel gas outlet of the vessel, the plurality of rupture discs comprising:
a first pair of rupture discs including a first rupture disc with a capacity to rupture at a predetermined lower level of over-pressure, and a second rupture disc with a capacity to rupture at a predetermined intermediate level of over-pressure, the first and second rupture discs being disposed opposite of each other symmetrically with respect to an axis of the vessel gas outlet;
a second pair of rupture discs including a third and fourth rupture discs having a capacity to rupture at a common predetermined higher level of over-pressure, the higher level of over-pressure being higher than the intermediate pressure and lower than the burst pressure of the vessel, the third and fourth discs disposed opposite of each other symmetrically with respect to the axis of the vessel gas outlet; and the vessel body further comprising an inlet for receiving into the vessel body a monomer/polymer mixture comprising gas and liquid and a nozzle in communication with the inlet, the nozzle configured to promote collection of a liquid at a bottom portion of the vessel body and to promote a discharge of gas through the vessel gas outlet, the vessel gas outlet being located at an upper portion of the vessel body.

24. The separator vessel of claim 23, wherein the vessel body includes a cylindrical central portion and the vessel gas outlet is concentric of the cylindrical central portion.

25. The separator vessel of claim 23, wherein the inlet extends radially through a wall of the vessel body and the communication between the inlet and the nozzle includes a passage having an arcuate portion of approximately 90°.

* * * * *